US 7,448,418 B1

(12) United States Patent
Tuyls (10) Patent No.: US 7,448,418 B1
(45) Date of Patent: Nov. 11, 2008

(54) FOOD PRODUCT BAG-TO-PUMP CONNECTOR

(75) Inventor: James M. Tuyls, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 19 days.

(21) Appl. No.: 11/099,420

(22) Filed: Apr. 4, 2005

Related U.S. Application Data (60) Provisional application No. 60/558,952, filed on Apr. 2, 2004.

(51) Int. Cl.
*B65B 1/04* (2006.01)

(52) U.S. Cl. .................. 141/351; 141/114; 141/301; 141/302; 251/149.1

(58) Field of Classification Search ............... 141/114, 141/301, 302, 346, 348, 351; 251/149.1–149.7; 137/614.02–614.04; 222/501, 525
See application file for complete search history.

(56) References Cited

U.S. PATENT DOCUMENTS 4,137,930 A * 2/1979 Scholle .................. 137/68.19
4,380,310 A * 4/1983 Schneiter et al. ............ 222/501
4,445,551 A * 5/1984 Bond et al. .................. 141/349
5,095,962 A * 3/1992 Lloyd-Davies et al. ...... 141/346
5,609,195 A * 3/1997 Stricklin et al. ............. 141/346
5,911,403 A   6/1999 deCler et al.
6,962,321 B1 * 11/2005 Savage et al. ............ 251/149.6

* cited by examiner

*Primary Examiner*—Steven O Douglas
(74) *Attorney, Agent, or Firm*—Townsend and Townsend and Crew LLP (57) ABSTRACT

The present invention relates to a connector that provides secure and convenient connection to a product container. In one embodiment, an apparatus for providing fluid flow connection to a container opening of a container comprises a connector including a proximal end, a distal end, a flow passageway extending between the proximal end and the distal end, and at least one side opening extending from an external surface of the connector to the flow passageway, the side opening being disposed between the distal end and the proximal end. The connector is configured to be inserted into the container opening and to be movable between a closed position and an open position. The side opening is blocked by an internal surface of the container opening in the closed position. The side opening is at least partially open to an interior of the container to permit fluid flow between the interior of the container and the flow passageway of the connector in the open position.

12 Claims, 6 Drawing Sheets

FOOD PRODUCT BAG-TO-PUMP CONNECTOR

CROSS-REFERENCES TO RELATED APPLICATIONS

This application claims the benefit of U.S. Provisional Patent Application No. 60/558,952, filed Apr. 2, 2004, the entire disclosure of which is incorporated herein by reference.

BACKGROUND OF THE INVENTION

This invention relates to a connector for food products and, more particularly, to a connector for connecting an opening of a container of a food product to a device such as a pump for pumping the food product.

Connectors for conveying food products are widely used. For example, U.S. Pat. No. 5,911,403 discloses a device for controlling fluid flow which includes a housing having a front end and a back end. The housing defines a flow passageway extending longitudinally between the front end and the back end. A first retaining structure is connected to the housing and positioned within the flow passageway. The device includes a valve mechanism for opening and closing the flow passageway of the housing. The valve mechanism includes a poppet member mounted within the flow passageway. The poppet member includes a first end opposite from a second end. The first end includes a second retaining structure that cooperates with the first retaining structure of the housing to provide a snap fit connection for retaining the poppet member within the housing. In this device, cooperating arrangements of movable assemblies incorporating springs and O-rings are used for flow control. In certain applications, these assemblies appear within the food contact/conveying flow and become a mechanism for trapping products or particles by virtue of their physical features. In addition, the operation of the device relies on correct assembly and connection with another component (e.g., product container outlet) without inadvertent misalignment (e.g., cross-threading). In certain cases, such necessary and cooperating threads are not provided on the other components. It is desirable to prevent trapping food products with the use of the connectors and provide convenient and thorough cleaning of connectors.

BRIEF SUMMARY OF THE INVENTION

The present invention relates to a connector that provides secure and convenient connection to a product container such as a fitting on a tubular bag and a method of using the connector to provide product flow control. The connector is configured so that its internal food product contact/conveying features are easily and readily cleanable. In one embodiment, the connector is used to connect a dispensing device such as a pump to a product container such as a tubular bag. The connector is movable between a closed position to close the opening of the product container and an open position to allow product flow through the opening of the product container. When the connector coupled with the product container is in the closed position, the container can be placed in a desired storage area such as a refrigeration unit. The connector is designed to minimize trapping materials, or impeding or preventing proper cleaning/sanitization. This is true for products that include relatively large particles. The connector does not trap particles, for instance, between sealing surfaces so as to cause malfunction. The connector is removable for cleaning/sanitization and for reuse.

An aspect of the present invention is directed to an apparatus for providing fluid flow connection to a container opening of a container. The apparatus comprises a connector including a proximal end, a distal end, a flow passageway extending between the proximal end and the distal end, and at least one side opening extending from an external surface of the connector to the flow passageway, the side opening being disposed between the distal end and the proximal end. The connector is configured to be inserted into the container opening and to be movable between a closed position and an open position. The side opening is blocked by an internal surface of the container opening in the closed position. The side opening is at least partially open to an interior of the container to permit fluid flow between the interior of the container and the flow passageway of the connector in the open position.

In some embodiments, the connector further comprises a distal seal around the external surface of the connector near the distal end. The distal seal is configured to be pressed between the external surface of the connector and the internal surface of the container opening during insertion of the connector into the container opening. The connector further comprises an intermediate seal around the external surface of the connector at an intermediate position between the proximal end and the distal end. The distal seal and the intermediate seal are disposed on opposite sides of the at least one side opening. The intermediate seal is configured to be pressed between the external surface of the connector and the internal surface of the container opening during insertion of the connector into the container opening. The distal seal and the intermediate seal may comprise O-rings. The distal seal and the intermediate seal may be formed integrally with the external surface of the connector. A retaining cap is disposed around the external surface of the connector in a region between the proximal end and the intermediate seal, the retaining cap being configured to be fastened to the container opening at a proximal end thereof. The retaining cap may be configured to be threadingly coupled to the proximal end of the container opening. The connector may further comprise an enlarged head near the proximal end, the enlarge head being larger than the container opening to prevent the connector from being inserted completely into the container.

In specific embodiments, a cooperative fitting includes a first end portion with a first opening, a second end portion with a second opening, and a flow path extending between the first opening and the second opening. The first end portion of the cooperative fitting is configured to be inserted into the flow passageway of the connector via the proximal end thereof. The cooperative fitting comprises at least one seal disposed around an external surface of the cooperative fitting near the first end portion, and the at least one seal is configured to be pressed between the external surface of the cooperative fitting and an internal surface of the container opening during insertion of the first end portion of the cooperative fitting into the flow passageway of the connector. The cooperative fitting further comprises a locking mechanism to lock the cooperative fitting with the connector upon insertion of the first end portion of the cooperative fitting into the flow passageway of the connector.

Another aspect of the present invention is directed to a method of providing fluid flow connection to a container opening of a container. The method comprises providing a connector including a proximal end, a distal end, a flow passageway extending between the proximal end and the distal end, and at least one side opening extending from an external surface of the connector to the flow passageway, the side opening being disposed between the distal end and the proximal end; inserting the connector into the container opening; moving the connector to a closed position in which the side opening is blocked by an internal surface of the container opening in the closed position; coupling the proximal end of the connector to an external device; and moving the connector to an open position in which the side opening is at least partially open to an interior of the container to permit fluid flow between the interior of the container and the external device via the flow passageway of the connector in the open position.

In some embodiments, the method further comprises providing a distal seal around the external surface of the connector near the distal end, the distal seal being configured to be pressed between the external surface of the connector and the internal surface of the container opening during insertion of the connector into the container opening. The method further comprises providing an intermediate seal around the external surface of the connector at an intermediate position between the proximal end and the distal end, the distal seal and the intermediate seal being disposed on opposite sides of the at least one side opening, the intermediate seal being configured to be pressed between the external surface of the connector and the internal surface of the container opening during insertion of the connector into the container opening. The method further comprises providing a retaining cap around the external surface of the connector in a region between the proximal end and the intermediate seal and fastening the retaining cap to the container opening at a proximal end thereof to secure the connector to the container opening.

In specific embodiments, the method further comprises providing a cooperative fitting which includes a first end portion with a first opening, a second end portion with a second opening, and a flow path extending between the first opening and the second opening; inserting the first end portion of the cooperative fitting into the flow passageway of the connector via the proximal end thereof; and moving the connector from the closed position to the open position. The method further comprises providing at least one seal disposed around an external surface of the cooperative fitting near the first end portion; and pressing the at least one seal between the external surface of the cooperative fitting and an internal surface of the container opening during insertion of the first end portion of the cooperative fitting into the flow passageway of the connector. The method further comprises providing a locking mechanism to lock the cooperative fitting with the connector upon insertion of the first end portion of the cooperative fitting into the flow passageway of the connector. The method further comprises locking the connector to the container opening upon insertion of the connector into the container opening, the connector being movable between the closed position and the open position with the connector being locked to the container opening; and locking the cooperative fitting to the connector upon insertion of the first end portion of the cooperative fitting into the flow passageway of the connector.

DETAILED DESCRIPTION OF THE INVENTION

FIGS. 1-4 show a connector or adapter 10 having a body 12 and a longitudinal flow passageway 14 extending therethrough. A first, distal seal 16 is disposed near the distal end of the body 12. A second, intermediate seal 18 is disposed away from the distal end at an intermediate position between the proximal end and the distal end of the connector body 12. In the embodiment shown, the distal seal 16 and the intermediate seal 18 are external O-rings. The O-rings 16, 18 are disposed in external circumferential slots 17, 19, respectively (see FIGS. 3 and 4). One or more side openings 20, 21 are disposed between the distal seal 16 and the intermediate seal 18, and provide flow communication between the longitudinal flow passageway 14 and the exterior. As best seen in FIG.

Figures 3, 4:
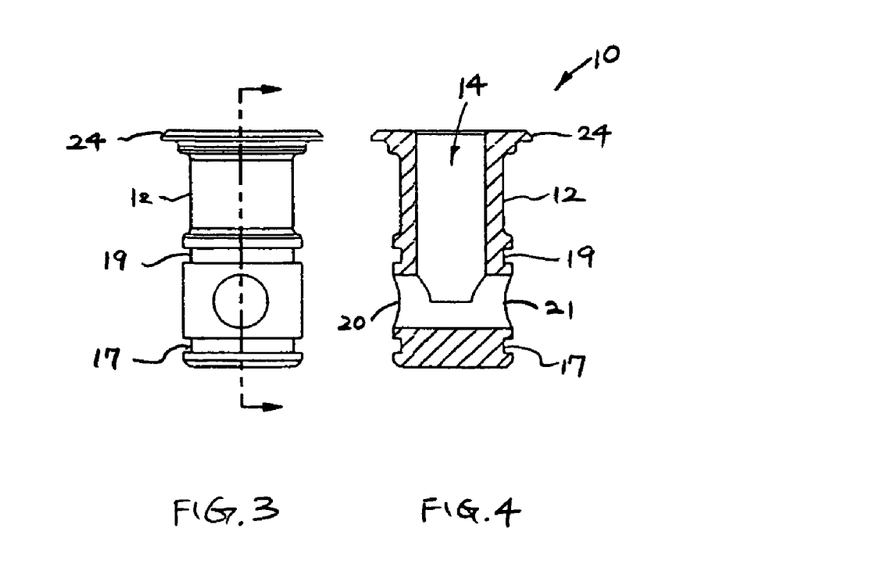
FIG. 3 is an elevational view of the connector of FIG. 1.
FIG. 4 is a cross-sectional view of the connector of FIG. 3.

4, the embodiment includes two side openings 20, 21. The body 12 includes an enlarged head 24 at or near the proximal end.

Figure 1:
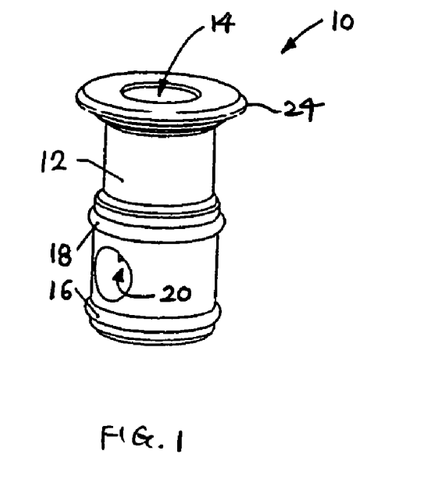
FIG. 1 is a perspective view of a connector according to an embodiment of the present invention.
Figure 2:
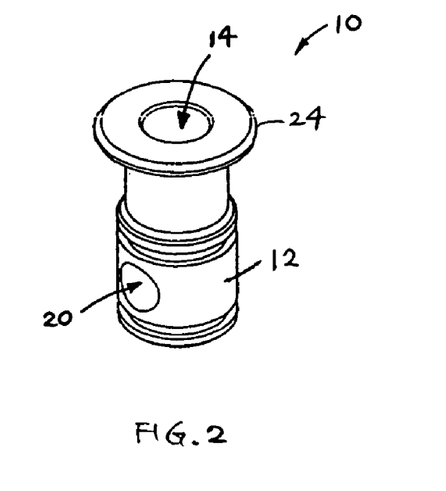
FIG. 2 is another perspective view of the connector of FIG. 1.
Figure 5:
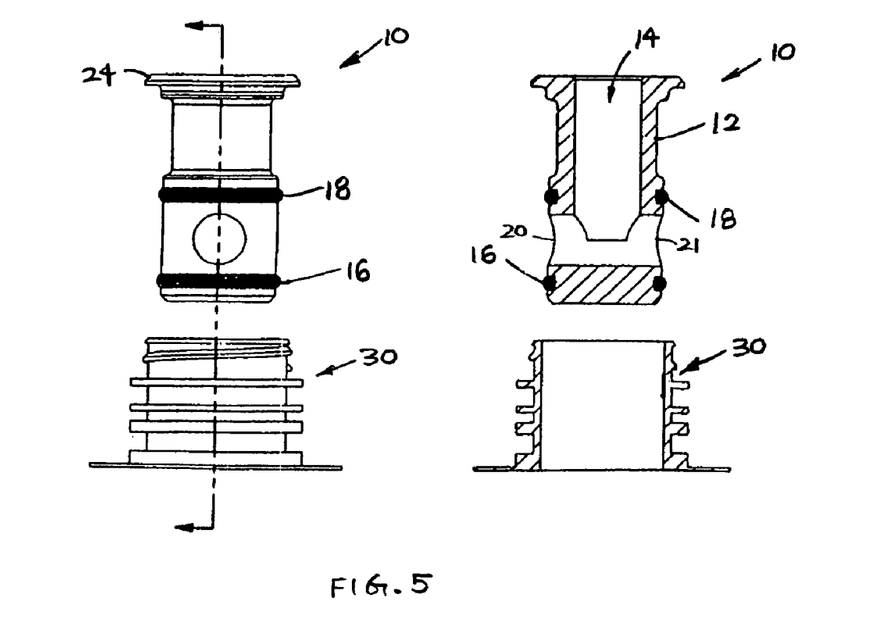
FIG. 5 shows the connector of FIG. 1 spaced from an opening of a container according to an embodiment of the invention.
Figure 6:
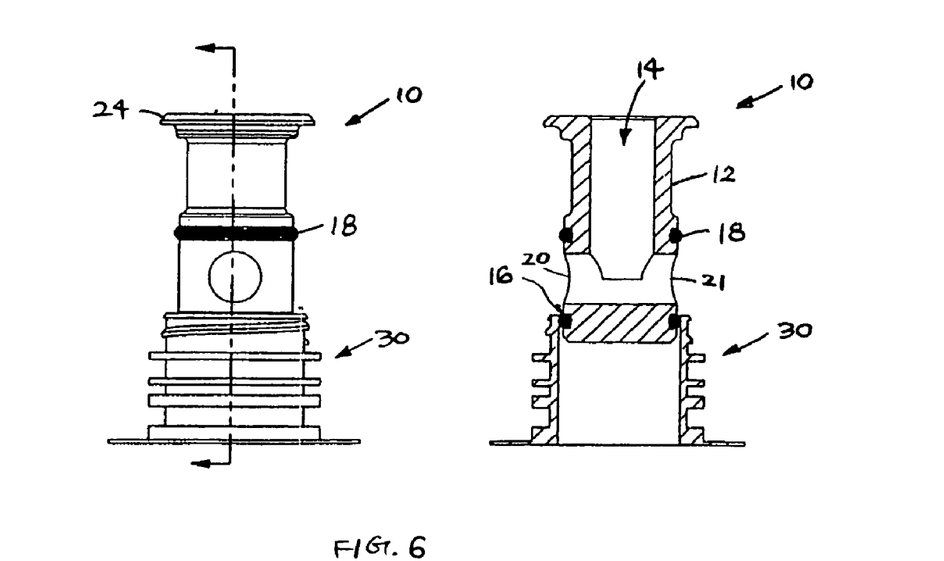
FIG. 6 shows the connector being inserted into the opening of the container of FIG. 5.
Figure 7:
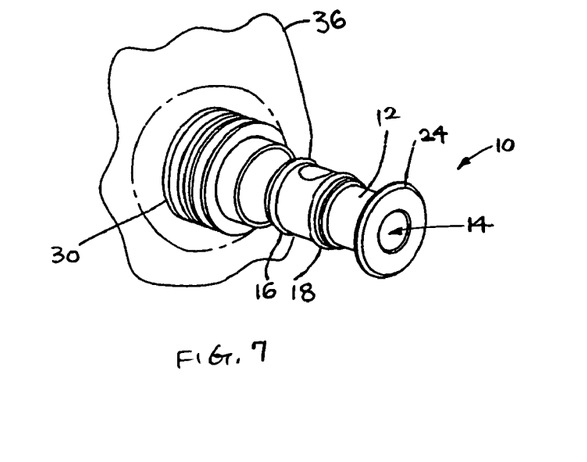
FIG. 7 is a perspective view showing the connector inserted into the opening of the container of FIG. 5 in a closed position.
Figure 8:
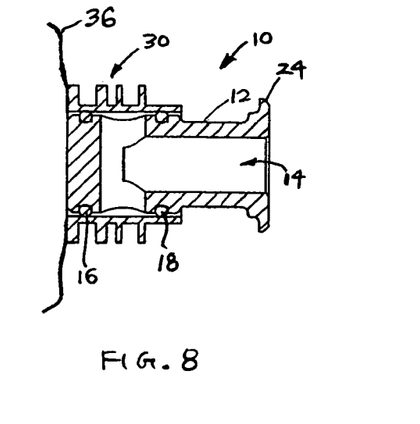
FIG. 8 is a cross-sectional view of the connector in the closed position of FIG. 7.

FIG. 5 shows the connector 10 of FIG. 1 spaced from an opening 30 of a container. The opening 30 may be provided as a product supply outlet, such as a fitting or spout on a tubular bag. In FIG. 6, the connector 10 is inserted into the opening 30 of the container of FIG. 5. The distal seal 16 is disposed between the connector body 12 and the interior surface of the opening 30 to seal the opening 30. During insertion of the connector 10 into the opening 30, the distal end of the connector 10 pushes any product disposed in the region of the opening 39 back into the container and avoids any overflow or spillage. FIGS. 7 and 8 show the connector 10 inserted into the opening 30 of the container 36 in a closed position. As best seen in FIG. 8, both seals 16, 18 are disposed between the connector body 12 and the interior surface of the opening 30 of the container to seal the opening 30. The side openings 20, 21 are closed by the interior surface of the opening 30. There is no fluidic communication between the interior of the container 36 and the exterior via the connector 10. In this closed position, the container 36 can be moved to another location for storage such as a refrigeration unit, or for dispensing product in the container 36 by a dispenser or pump. The seals 16, 18 provide sealing between the connector body 12 and the container opening 30, and may further provide a press fit to couple the connector body 12 and the container opening 30 by virtue of the frictional forces of the seals 16, 18.

Figure 9:
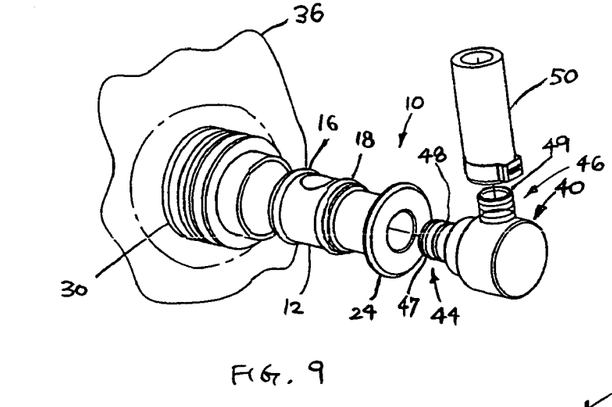
FIG. 9 is a perspective view showing a cooperative fitting to be coupled to the connector inserted into the opening of the container in the closed position of FIG. 7 according to an embodiment of the present invention.

FIG. 9 shows a cooperative fitting or connector 40 (e.g., a pump connector) to be coupled to the connector 10 which is inserted into the opening 30 of the container 36 in the closed position of FIGS. 7 and 8. The cooperative fitting 40 includes a first opening 42 provided through a first end portion 44 to be coupled to the proximal end of the connector 10, and a second opening 45 at a second end portion 46 to be coupled to a hose or tube 50. One or more seals 47, 48 are provided on the external surface of the cooperative fitting 40 around the first end portion 44. One or more seals 49 is provided on the external surface of the cooperative fitting 40 around the second end portion 46. The second end portion 46 is configured to be inserted into the tube 50. The first opening 42 and the second opening 45 are in fluidic communication with one another.

Figure 10:
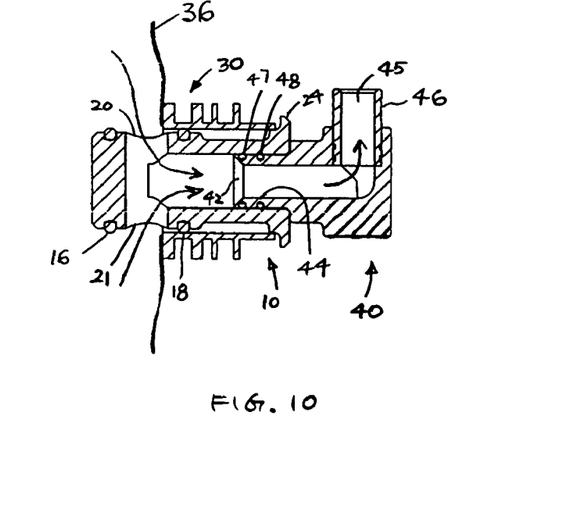
FIG. 10 is a cross-sectional view showing the connector inserted into the opening of the container in an open position and the cooperative fitting of FIG. 9 coupled to the connector.

FIG. 10 shows the first end portion 44 of the cooperative fitting 40 connected to the proximal end of the connector 10. The first end portion 44 is inserted into the longitudinal flow passageway 14 of the connector 10 at the proximal end with the seals 47, 48 disposed therebetween. The force applied to insert the first end portion 44 into the passageway 14 can further push the connector 10 from the closed position of FIG. 8 to an open position of FIG. 10. The enlarged head 24 prevents the connector 10 from being pushed further into the interior of the container 36. As seen in the open position of FIG. 10, the intermediate seal 18 remains disposed between the connector body 12 and the interior surface of the container opening 30. In the open position, the side openings 20, 21 of the connector 10 are exposed to the interior of the container 36 to allow fluidic communication between the interior of the container 36 and the tube 50 via the connector 10 and the cooperative fitting 40. The conveying tube 50 may be coupled to a dispensing device or pump to pump product from the container 36. Although FIGS. 9 and 10 show a cooperative fitting having a L-shaped flow passage between the first opening 42 and the second opening 45, the flow passage in other embodiments may be linear or have other shapes.

Figure 11:
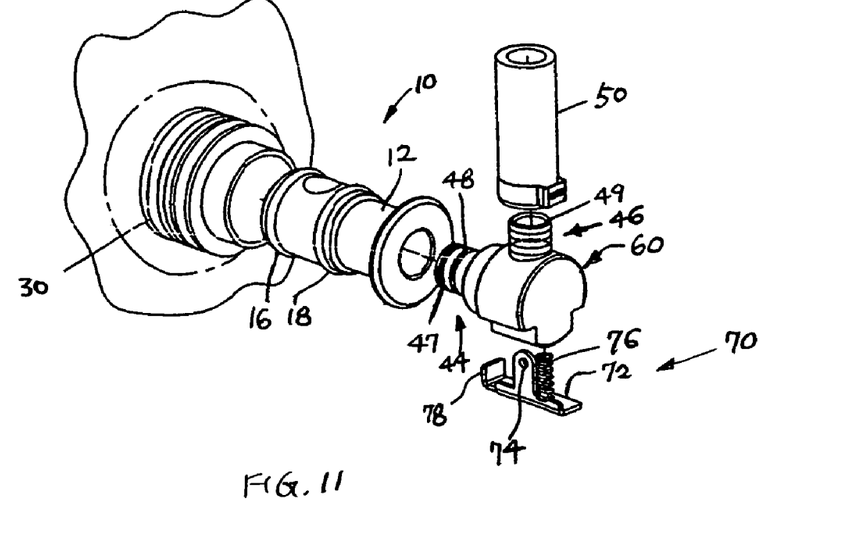
FIG. 11 is a perspective view showing a cooperative fitting with a locking mechanism to be coupled to the connector inserted into the opening of the container in the closed position of FIG. 7 according to another embodiment of the present invention.
Figure 12:
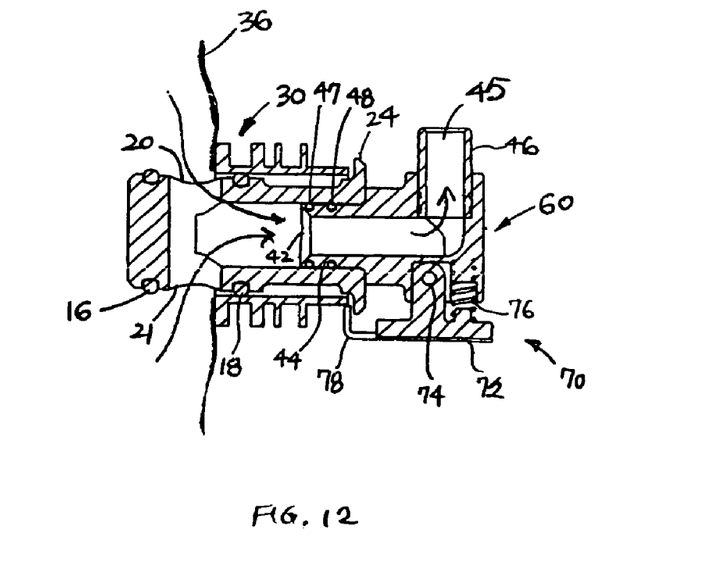
FIG. 12 is a cross-sectional view showing the connector inserted into the opening of the container in an open position and the cooperative fitting of FIG. 11 coupled and locked to the connector.

FIGS. 11 and 12 show a cooperative fitting 60 with a locking mechanism 70, to be coupled to the connector 10 inserted into the opening 30 of the container 36 at the first end portion 44 with first opening 42, and to be coupled to the tube 50 at the second end portion 46 with the second opening 45. The locking mechanism 70 includes a lever 72 coupled to the cooperative fitting 60 at a pivot 74. On one side of the pivot 74 is a spring 76 connected between the cooperative fitting 60 and the lever 72. On the other side of the pivot 74 is a locking clip 78 which protrudes from the lever 72 at an angle toward the cooperative fitting 60. As seen in FIG. 12, the clip 78 is configured to engage the connector 10 under the force of the spring 76 to be captured by the enlarged head 24 to prevent inadvertent disconnection of the cooperative fitting 60 from the connector 10. The locking clip 78 can be disengaged from the connector 10 by pressing on the opposite side of the lever 72 to compress the spring 76.

Figure 13:
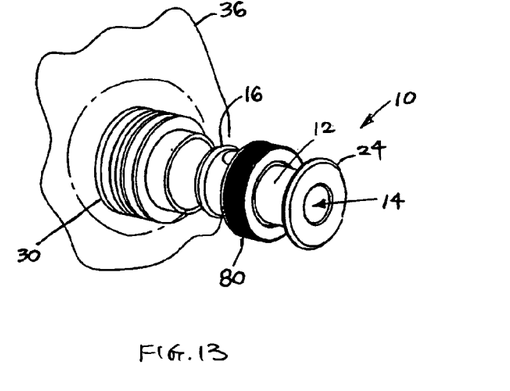
FIG. 13 is a perspective view showing a connector inserted into the opening of a container in a closed position according to another embodiment of the present invention.
Figure 14:
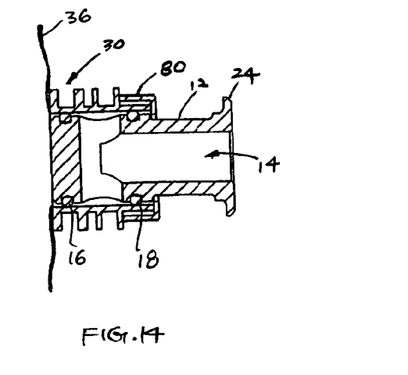
FIG. 14 is a cross-sectional view of the connector in the closed position of FIG. 13.
Figure 15:
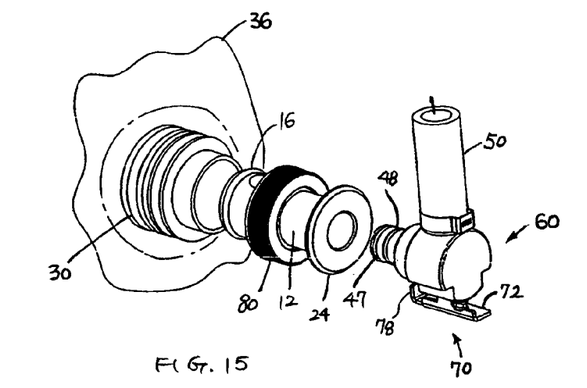
FIG. 15 is a perspective view showing a cooperative fitting with a locking mechanism to be coupled to the connector inserted into the opening of the container in the closed position of FIG. 13 according to an embodiment of the present invention.
Figure 16:
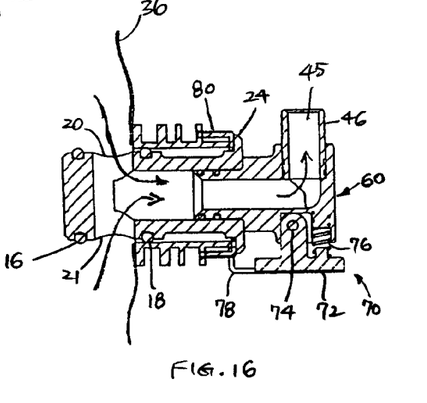
FIG. 16 is a cross-sectional view showing the connector inserted into the opening of the container in an open position and the cooperative fitting of FIG. 15 coupled and locked to the connector.

FIGS. 13 and 14 show the connector 10 inserted into the opening 30 of the container 36 in the closed position. In this embodiment, a retaining or locking cap 80 is disposed in a region of the connector 10 between the intermediate seal 18 and the enlarged head 24. The retaining cap 80 has interior threads that mate with exterior threads of the connector 10 near the proximal end to secure the connector 10 to the container 36. This prevents inadvertent disconnection of the connector 10 from the container 36. As seen in FIGS. 15 and 16, the locking mechanism 70 as described above prevents inadvertent disconnection of the cooperative fitting 40 from the connector 10.

Figure 17:
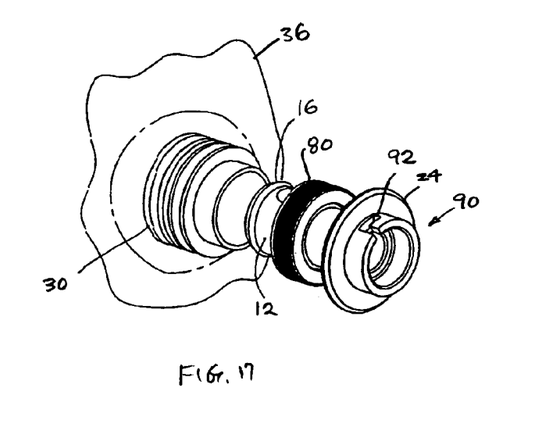
FIG. 17 is a perspective view showing a connector inserted into the opening of a container in a closed position according to another embodiment of the present invention.
Figure 18:
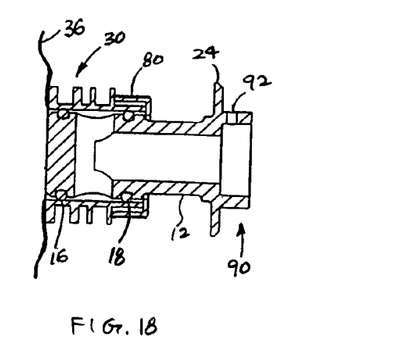
FIG. 18 is a cross-sectional view of the connector in the closed position of FIG. 17.
Figure 19:
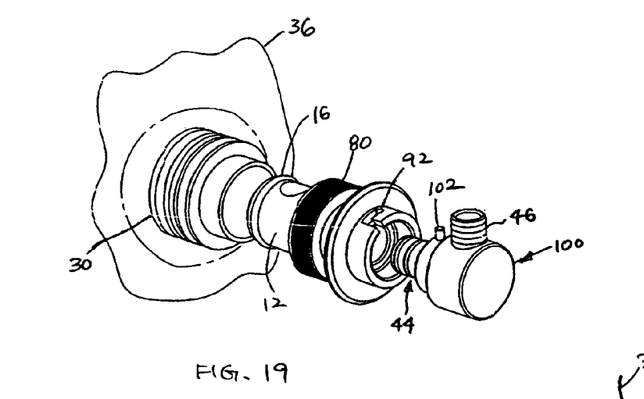
FIG. 19 is a perspective view showing a cooperative fitting with a locking mechanism to be coupled to the connector inserted into the opening of the container in the closed position of FIG. 17 according to an embodiment of the present invention.
Figure 20:
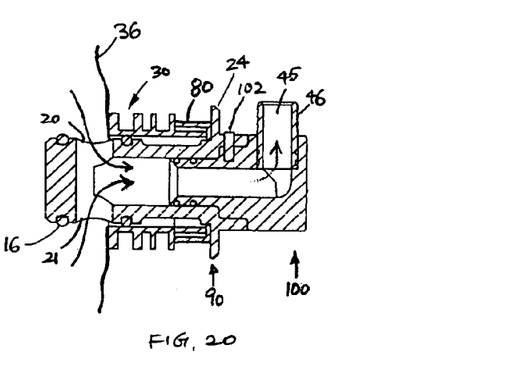
FIG. 20 is a cross-sectional view showing the connector inserted into the opening of the container in an open position and the cooperative fitting of FIG. 19 coupled and locked to the connector.

FIGS. 17 and 18 show a connector 90 inserted into the opening 30 of the container 36 in a closed position. The connector 90 includes a bayonet or twist lock slot 92 provided at the proximal end. The slot 92 is proximal to the enlarged head 24. In the embodiment show, the slot 92 has an L shape. FIGS. 19 and 20 show a cooperative fitting 100 including a Bayonet or twist lock pin 102 which engages the twist lock slot 92 by twisting the cooperative fitting 100 relative to the connector 90. The twist lock mechanism prevents the cooperative fitting 100 from inadvertent disconnection from the connector 90. The embodiment also includes a retaining cap 80 for securing the connector 90 to the container 36.

The connector 10, 90 provides an easy and secure connection to the container opening 30. The fluid flow through the connector can be easily controlled by moving the connector between the closed position and the open position. The connector and the cooperative fitting 40, 100 are designed to minimize trapping materials, or impeding or preventing proper cleaning/sanitization. This is true for products that include relatively large particles. The apparatus does not trap particles, for instance, between sealing surfaces so as to cause malfunction. The connector and the cooperative fitting are removable for cleaning/sanitization and for reuse. The connector and the cooperative fitting, as well as associated components, may be made of any suitable material, including metals such as stainless steel, and plastics. In the case of molded plastic components, the seals such as O-rings may be integrally formed with the molded plastic components (connector and cooperative fitting), and made with the appropriate durometer material for sealing purposes. Moreover, the connector can have different sizes to adapt to different sizes of the container opening for the same cooperative fitting, or different sizes of the cooperative fitting also.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An apparatus for providing fluid flow connection to a container, the apparatus comprising:
   an opening spout on the container,
   a removably insertable connector including a proximal end, a distal end, a flow passageway extending between the proximal end and the distal end, and at least one side opening extending from an external surface of the connector to the flow passageway, the side opening being disposed between the distal end and the proximal end,
   wherein the connector is configured to be removably inserted into the opening spout on the container opening and to be movable between a closed position and an open position, the side opening being blocked by an internal surface of the container opening in the closed position, the side opening being at least partially open to an interior of the container to permit fluid flow between the interior of the container and the flow passageway of the connector in the open position,
   said connector further comprising a distal seal near the distal end and an intermediate seal at an intermediate position between the proximal and the distal end, said distal and said intermediate seals being disposed on the opposite sides of the at least one side opening, said seals being configured to be pressed between the external surface of the connector and internal surface of the container opening spout during insertion of the connector into the container opening
   a detachable cooperative fitting which includes a first end portion with a first opening, a second end portion with a second opening, and a flow path extending between the first opening and the second opening and at least one seal disposed between the cooperative fitting and the connector,
   wherein the first end portion of the cooperative fitting is configured to be inserted into the flow passageway of the connector via the proximal end thereof.

2. The apparatus of claim 1 wherein the distal seal and the intermediate seal comprise O-rings.

3. The apparatus of claim 1 wherein the distal seal and the intermediate seal are formed integrally with the external surface of the connector.

4. An apparatus for providing fluid flow connection to a container, the apparatus comprising:
   an opening spout on the container,
   a removably insertable connector including a proximal end, a distal end, a flow passageway extending between the proximal end and the distal end, and at least one side opening extending from an external surface of the connector to the flow passageway, the side opening being disposed between the distal end and the proximal end,
   wherein the connector is configured to be removably inserted into the opening spout on the container opening and to be movable between a closed position and an open position, the side opening being blocked by an internal surface of the container opening in the closed position, the side opening being at least partially open to an interior of the container to permit fluid flow between the interior of the container and the flow passageway of the connector in the open position,
   said connector further comprising a distal seal near the distal end and an intermediate seal at an intermediate position between the proximal and the distal end, said distal and said intermediate seals being disposed on the opposite sides of the at least one side opening, said seals being configured to be pressed between the external surface of the connector and internal surface of the container opening spout during insertion of the connector into the container opening
   a detachable cooperative fitting which includes a first end portion with a first opening, a second end portion with a second opening, and a flow path extending between the first opening and the second opening and at least one seal disposed between the cooperative fitting and the connector,
   wherein the first end portion of the cooperative fitting is configured to be inserted into the flow passageway of the connector via the proximal end thereof, and
   a retaining cap disposed around the external surface of the connector in a region between the proximal end and the intermediate seal, the retaining cap being configured to be fastened to the container opening spout at a proximal end thereof.

5. The apparatus of claim 4 wherein the retaining cap is configured to be threadingly coupled to the proximal end of the container opening.

6. The apparatus of claim 1 wherein the connector further comprises an enlarged head near the proximal end, the enlarged head being larger than the container opening to prevent the connector from being inserted completely into the container.

7. The apparatus of claim 1 wherein the cooperative fitting comprises at least one seal disposed around an external surface of the cooperative fitting near the first end portion, and wherein the at least one seal is configured to be pressed between the external surface of the cooperative fitting and an internal surface of the connector during insertion of the first end portion of the cooperative fitting into the flow passageway of the connector.

8. The apparatus of claim 1 wherein the cooperative fitting further comprises a locking mechanism comprising of a twist lock pin and a twist lock slot to lock the cooperative fitting with the connector upon insertion of the first end portion of the cooperative fitting into the flow passageway of the connector.

9. A method of providing fluid flow connection to a container opening of a container, the method comprising:
   providing an opening spout on the container
   providing a removably insertable connector including a proximal end, a distal end, a flow passageway extending between the proximal end and the distal end, at least one side opening extending from an external surface of the connector to the flow passageway, the side opening being disposed between the distal end and the proximal end, and a distal seal and an intermediate seal disposed around the external surface of the connector on the opposite sides of the at least one side openings, said seals being configured to be pressed between the external surface of the connector and the internal surface of the container opening during insertion of the connector into the container opening;
   inserting the connector into the container opening spout;
   moving the connector to a closed position in which the side opening is blocked by an internal surface of the container opening in the closed position;
   coupling the proximal end of the connector to a detachable cooperative fitting which includes a first end portion with a first opening, a second end portion with a second opening, a flow path extending between the first opening and the second opening, and at least one seal disposed between the cooperative fitting and the connector; and
   moving the connector to an open position in which the side opening is at least partially open to an interior of the container to permit fluid flow between the interior of the container and the detachable cooperative fitting via the flow passageway of the connector in the open position.

10. The method of claim 9 further comprising:
providing a retaining cap around the external surface of the connector in a region between the proximal end and the intermediate seal and
fastening the retaining cap to the container opening spout at a proximal end thereof to secure the connector to the container opening spout.

11. The method of claim 9 further comprising:
providing a locking mechanism comprising of a twist lock pin and a twist lock slot to lock the cooperative fitting with the connector upon insertion of the first end portion of the cooperative fitting into the flow passageway of the connector.

12. The method of claim 9 further comprising removing the connector from the opening spout on the container, and reusing the connector on another container.

* * * * *